3,537,950
SANDWICH LAMINATE COMPRISING A SUB-STANTIALLY NONIMPREGNATED PRINT INLAY SHEET BETWEEN IMPREGNATED OVERLAY AND BASE COVER SHEETS
Edward C. Hale, Beaconsfield, Quebec, Canada, assignor to Domtar Limited, Montreal, Quebec, Canada, a company of Canada
No Drawing. Continuation-in-part of application Ser. No. 324,832, Nov. 19, 1963. This application Apr. 4, 1968, Ser. No. 718,937
Claims priority, application Canada, Nov. 24, 1962, 863,072
Int. Cl. B32b 27/10, 27/42
U.S. Cl. 161—258                           6 Claims

ABSTRACT OF THE DISCLOSURE

The present invention relates to a laminating layup for forming high pressure thermoset laminates. The layup incorporates between the conventional thermosetting resin impregnated overlay and base-cover sheets a substantially non-impregnated paper-base porous and absorbent inlay having a printed design on one surface thereof.

---

The present application is a continuation-in-part of U.S. patent application Ser. No. 324,832, filed Nov. 19, 1963.

This invention relates to a method of producing a decorative laminate. More particularly, the invention relates to a laminate having a decorative insert such as a map, mural or the like sandwiched therein and to a method of producing such laminates.

The majority of decorative high pressure thermoset laminates are made from laminating layups consisting of a resin impregnated overlay, a resin impregnated base-cover sheet and a plurality of resin impregnated core sheets. The overlay becomes transparent when the laminate is cured under conditions of high temperature and pressure. In this type of laminate the core sheets are impregnated with a darker less expensive resin than the overlay and cover sheets. It is one of the functions of the cover sheet to prevent the darker colour of the laminating resin of the core from being visible through the overlay sheet and spoiling the decorative design of the laminate. The second main function of the cover sheet is to carry the printed design. A typical decorative laminate is described in U.S. Pat. 2,773,788, issued Dec. 11, 1956 to Magrane et al. This patent also describes a typical industrial laminate which, of course, does not incorporate a printed design and is formed using one laminating resin only, and sometimes the more expensive resin generally used in the overlay and cover sheets of a decorative laminate. Each laminating paper in the industrial laminate layer carries the normal amount of laminating resin used under conventional laminating practice to bond the laminate together.

When special designs are to be incorporated into a laminate, a different laminating layup is required. These laminating layups incorporating a special decorative print between the overlay and cover sheets are formed by one of three processes described hereinbelow.

(1) The map or print to be used would be obtained on the thinnest commercially available printing papers. This print would then be coated with an aqueous solution of laminating resins, the solvents dried off, and the whole heated to advance the resin cure to a point where it would be suitable for normal thermosetting laminating techniques—the resinized map being placed underneath a protective overlay of resin impregnated alpha or rayon cellulose paper. The panel construction was as follows:

Normal protective overlay with laminating resin;
Resin coated map or print;
Normal decorative colour base paper with laminating resin; or other type resins;
Normal corestock papers treated with laminating resin—normally phenolic resin;
Normal balancing paper with melamine or phenol resin or the like.

These layers were then consolidated and fused together with sufficient pressure and heat to effect a proper cure of the resins. The resultant laminate would to all appearances be similar to a normal decorative paper-base laminate.

It was found that this method suffered, in that the end quality of the laminate was poor and processing difficulties caused high rejects.

The main processing difficulties were that the individual prints had to be excessively handled and the coating with laminating resin and subsequent drying and advance of cure were difficult to control. In addition, the resin would normally not penetrate sufficiently into these relatively dense papers, with the net result that excessive surface resin was introduced between the interlaminar layers, leading to a mechanical weakness. The lack of penetration of the resin into the print paper itself also led to an inherent weakness in the strength of this layer. As a result of these facts, it was found that the release of volatiles from the paper and the water of condensation from the resin during the pressing operation would frequently lead to the formation of small surface or interlaminar blisters caused by the inability of these weakened areas to resist the stresses imposed by the vapour build-up. Even when these defects were absent, it was found that subsequent normal quality tests, such as a 2-hour water boil, or heat tests such as simulated cigarette burns, would result in blister formation, surface crazing, and general delamination within the print paper itself.

(2) The second method is similar to the above, but the printed map or design sheet is not pre-coated with laminating resin. Instead, both the normal resinized protective overlay and the base colour decorative paper were processed to contain an excess of resin sufficient to flow during cure under heat and partially penetrate and laminate the printed map or design paper.

This process, while not so cumbersome in the handling, gave the same blistering, crazing and delamination problems as with the first method.

(3) The third method used differed from the above two and would produce good quality laminates. It consisted of taking a more absorbent sheet, similar and, in some cases, the same as the normal protective alpha or rayon cellulose paper, impregnating it with the normal amount of laminating resin and advancing the cure to a stage suitable for laminating. The required design would then be printed on this sheet by methods such as silkscreen or flat press printing, where the extremely brittle and fragile resin impregnated sheet would have minimal breakage. In many cases the print inks would require subsequent drying and heating to remove the solvents which cause further difficulties by overcure of the resin contained, thereby leading to occasional lamination failure. The high concentration of three layers of laminating resin in the (a) protective overlay, (b) print paper, and (c) the base couler paper, also led to further difficulties with warpage of the composite panel. The resin pick-up of these components would normally be:

|  | Percent |
|---|---|
| (a) Protective overlay | 62–72 |
| (b) Print paper | 50–72 |
| (c) Base colour paper | 40–60 |

The addition of the high resin content in the print paper, while effecting proper lamination, also gave a closed, dense and homogeneous surface for proper printing. The high resin content, however, caused warpage, increased cost, raised handling problems because of brittleness, and frequently led to difficulties in the selection of ink which would not leave a thick film which could subsequently introduce mechanical weakness leading to blister formation and crazing. With this method, only high cost printing methods could be used.

Thus, prior to the instant invention, there was no known method for efficiently producing a good quality laminate incorporating an insert of printed material such as a map or the like.

It is thus an object of the present invention to provide a new laminating layup incorporating a printed inlay, which layup, under normal pressing operations, will yield a high quality laminate.

It is another object of the present invention to provide a new printed inlay for a laminating layup, which inlay may be printed using inexpensive printing techniques.

Broadly stated, the present invention uses an insert, or print, of a paper having the absorbency and porosity characteristics necessary to effect proper penetration of the resins during cure when sandwiched between the resinized protective overlay and the resinized base colour sheet, and having printing characteristics suitable for use with any printing methods, including continuous rotogravure type of printing.

This disclosure will only specifically describe the top three sheets of the laminate, that is, the sandwich composed of the overlay, the insert or print and the decorative colour sheet. The remainder of the laminate is composed of standard laminating materials such as corestock and balancing papers. The decorative colour sheet serves to mask the remainder of the laminate to maintain a pleasing appearance to the surface.

The essential characteristics of an inlay are: high porosity and absorbency, the ability to be fine printed, thickness and low resin content for flexibility. One suitable paper for this purpose is the alpha cellulose overlay paper commonly used in the laminating industry.

One of the essential characteristics of the inlay, the porosity, must be within the range of about 2–90 seconds per 300 cc's. for five sheets. The porosity is dependent on the basis weight of the sheet, which must be in the range of about 14–100 lbs./3000 sq. ft., preferably the papers used will have a basis weight of between about 14 and 30 lbs./3000 sq. ft. with a porosity in the range of about 2–12 seconds per 300 cc's. for five sheets. The best results have been obtained using a paper having a basis weight of 28–30 lbs./3000 sq. ft. and the porosity of 6–12 seconds per 300 cc's. for five sheets. The higher the basis weight of the paper, the higher the porosity time required. Usually these higher basis weight papers are used as pigmented paper and are intended also to function as a cover sheet. If the porosity of the paper is not within the above stated ranges the laminate will not pass the required tests outlined above for high quality laminates.

The bulk density, which together with the porosity aid in determining the absorbency of the inlay, also must be in a relatively close range if high quality laminates are to be produced. Applicant has found that the bulk density of the paper should not exceed 115, and should never be less than 85, based on a basis weight per 3000 sq. ft. or an inoperative laminate will be produced. Preferably the bulk density will be in the range of 95–105.

Originally it was believed that these highly porous and absorbent papers could not be fine printed, however, on experiment surprisingly it was found that a print with fine details and clarity could be produced. However, because of the above characteristics of the inlay sheet not all such sheets could be handled in the normal manner for rotogravure or offset printing due to the limpness of the inlay paper. The simplest method applicant has found for overcoming this inherent limpness in the sheet, is by adding a little stiffening resin compatible with the resin system of the overlay and cover sheets, such as a melamine formaldehyde resins or urea-formaldehyde resin or modifications thereof. The amount used should be sufficient only to remove the limpness of the sheet to a degree where the sheet can be printed in the normal manner using conventional printing apparatus and thereby utilize relatively inexpensive techniques. The amount of resin used must never be sufficient to rigidify the sheet as was conventionally thought required for adequate bonding, since it then becomes impossible to print using the techniques desired and the printed sheets are very easily damaged. The flexible inlay sheet of the present invention is easily handled and cannot be easily damaged. To obtain the required characteristics for printing, the inlay must never be treated to a resin pick-up of over 20% since above this resin pick-up the sheet becomes stiff and difficult to print and the resultant laminate may well be of inferior quality. Generally the total amount of resin used for stiffening the inlay will not exceed about 10%. If this resin is added to the beater in the process of forming the paper then the total resin added to stiffen will be generally in the range of about 3–8% by weight. Other means for stiffening may be used provided such means do not greatly reduce the porosity and absorbency of the paper or interfere with the action of the laminating resins contained in the adjacent panel layers.

The resin control of the base-cover sheet and the overlay sheet may vary. A base-cover sheet impregnated to a resin pick-up of about 35–55% may be used, but it is preferred to use a base-cover sheet impregnated to a pick-up of 45–50%. The overlay may be impregnated to a resin pick-up of about 62–77%, but it is preferred to use a sheet impregnated with about 65–74%. If too much resin in present the surface of a laminate structure will be weaker and will suffer defects such as cracking. If too little resin is present the laminate will not be properly fused and bonded resulting in obvious disadvantages. The resins in the overlay will be melamine formaldehyde resins or modified melamine formaldehyde resins, while those in the cover sheet will be melamine formaldehyde resins or modified melamine formaldehyde resins, or urea formaldehyde resins, or modified urea-formaldehyde resins.

To summarize, applicant has found that a laminating layup composed of (1) an overlay sheet impregnated with a melamine formaldehyde resins or a modified melamine formaldehyde resin to a resin pick-up of 62–77% and preferably 65–74%, (2) a flexible printed inlay having (a) a porosity of 5–90 seconds per 300 cc. per five sheets, (b) a bulk density of 85–115 and preferably 95–105 based on basic weight pounds per 3000 sq. ft., (c) a basis weight of 14–100 lbs./3000 sq. ft., preferably 14–30 lbs./3000 sq. ft. and (d) resin content of less than 20% and preferably less than 10%, (3) a cover sheet impregnated with melamine formaldehyde resin or urea formaldehyde resins or modifications thereof to a resin pick-up of 35–55% and preferably 45–50%, (4) the normal resin impregnated core sheets will provide the desired results and permit the use of relatively inexpensive printing techniques for printing inlays for incorporation into a high pressure thermosetting laminate.

The following is a specific example of one form of the invention.

Alpha overlay paper having the following characteristics:

Basic weight—28–30 lbs./3000 sq. ft.
Mullen—14
Mullen, percent—108%

Tear—38
Tear, percent—146%
Caliper—4.9
Opacity—0.76
Densometer—7–12 seconds per 300 cc. for five sheets
Klem:
    M.C.—19½
    C.D.—18
Wet tensile—3.20
pH—5.3
Melamine resin content—5–5.4%.

was printed with the desired design. This printed sheet is placed between a base colour sheet treated to a resin content of 40 to 47% of melamine formaldehyde resin and an overlay sheet. The overlay used is the type commonly employed in the art, treated to a resin pick-up of 65% to 77% melamine formaldehyde resin and having a tested resin flow value of 10% to 20%. The printed surface of the inlay or print faced the exposed overlay sheet. This sandwich, together with the remainder of the laminate was then placed in a heat press and pressure was applied to effect proper cure of the resin as is well known in the art.

Thus applicant has disclosed a method of producing a sandwich type laminate of superior quality which may be produced with commonly used laminating resins having product of condensation such as water for example.

Variations may be made from the disclosed procedure without departing from the spirit of the invention as defined in the appended claims.

I claim:

1. A laminating layup adapted on pressing to form a thermoset laminate comprising an overlay sheet treated to a resin pick-up of 62–77% with a resin selected from the group consisting of melamine formaldehyde resins and modified melamine formaldehyde resins, a base cover sheet impregnated to a resin pick-up of 35–55% with a resin selected from the group consisting of melamine formaldehyde resin, modified melamine formaldehyde resin, urea formaldehyde resins and modified urea formaldehyde resins, and a flexible printed inlay between said overlay and cover sheets, said inlay having a porosity of 5–90 seconds per 300 cc. per five sheets, a bulk density of 85–115 based on a basis weight in lbs./3000 sq. ft., a basis weight of 14–100 lbs./3000 sq. ft. and a stiffening resin content of 0–20%.

2. A laminating layup as defined in claim 1 wherein said flexible printed inlay has a porosity of 2–12 seconds per 300 cc. for five sheets, a bulk density, of 95–105 based on a basis weight in lbs./3000 sq. ft., a basis weight of 14–30 lbs./3000 sq. ft. and a stiffening resin content of 0–20%.

3. A layup as defined in claim 2 wherein said flexible printed inlay has a resin content of 0–10%.

4. A laminating layup as defined in claim 3 wherein said stiffening resin is selected from the group consisting of melamine formaldehyde resin, modified melamine formaldehyde resin, urea formaldehyde resin, and modified urea formaldehyde resins.

5. A laminating layup as defined in claim 4 wherein said overlay sheet is impregnated to a resin pick-up of 65–74%.

6. A laminating layup as defined in claim 5 wherein said base-cover sheet is impregnated, to a resin pick-up of 45–50%.

References Cited
UNITED STATES PATENTS

| | | | |
|---|---|---|---|
| 2,773,788 | 12/1956 | Magrane et al. | 260—39 X |
| 2,801,198 | 7/1957 | Morris et al. | 16—263 X |
| 2,816,851 | 12/1957 | Arledter | 161—413 X |
| 3,131,116 | 4/1964 | Pounds | 161—258 |
| 3,294,622 | 12/1966 | Wark | 161—264 |

JOHN T. GOOLKASIAN, Primary Examiner

D. J. FRITSCH, Assistant Examiner

U.S. Cl. X.R.

161—413, 263, 161